US005095196A

United States Patent [19]

[11] Patent Number: 5,095,196

[45] Date of Patent: Mar. 10, 1992

Miyata

[54] SECURITY SYSTEM WITH IMAGING FUNCTION

[75] Inventor: Kunio Miyata, Tokyo, Japan

[73] Assignee: Oki Electric Industry Co., Ltd., Tokyo, Japan

[21] Appl. No.: 456,797

[22] Filed: Dec. 28, 1989

[30] Foreign Application Priority Data

Dec. 28, 1988 [JP] Japan ............ 63-329265
Apr. 11, 1989 [JP] Japan ............ 1-89659
Nov. 13, 1989 [JP] Japan ............ 1-292509

[51] Int. Cl.[5] ............ G06K 7/00; G06K 7/01

[52] U.S. Cl. ............ 235/382; 235/380

[58] Field of Search ............ 235/382, 380, 488, 487; 283/904, 75, 77

[56] References Cited

U.S. PATENT DOCUMENTS 4,663,518 5/1987 Borror et al. ............ 235/487
4,712,103 12/1987 Gotanda ............ 235/382
4,811,408 3/1989 Goldman ............ 235/380
4,879,747 11/1989 Leighton et al. ............ 235/380

*Primary Examiner*—Stuart S. Levy
*Assistant Examiner*—Richard M. Weinberg
*Attorney, Agent, or Firm*—Spencer & Frank

[57] ABSTRACT

A system for examining a passer having an ID card including a photograph and key data for searching registered data of the passer. This system has a data base storing registered data including a video image of the registered ID card owner, a video camera for capturing the passer's figure and a scanner for scanning the photograph of the ID card. The system searches corresponding data, including the video image data, in the data base, using the key data, and displays the found image, passer's image and the scanned photograph image in a display for comparison by an examiner. The system can be combined with a controllable gate system which the examiner can operate based on the results of the examination.

16 Claims, 16 Drawing Sheets

SECURITY SYSTEM WITH IMAGING FUNCTION

REFERENCE TO RELATED APPLICATIONS

This application claims rights of priority under 35 U.S.C. 119 of Japanese Application Serial No. 329265/88, filed Dec. 28th, 1988, Japanese Application Serial No. 659/88, filed Apr. 11th, 1988, and a Japanese Application entitled "Automatic Examination Apparatus with Automatic Open/Close Gate System," filed on Nov. 13th, 1989, the entire disclosures of which are hereby incorporated by reference.

BACKGROUND OF THE INVENTION

1. Field of the Invention

This invention relates to a security system for checking a person's authority to pass a check point into a high security area, and particularly to such a system combined with an automatic gate system which is controlled by the security system.

2. Description of the Related Art

At places where high security is needed, such as a computer center, a laboratory, or a government facility, a security check requiring use of an identification card (hereinafter ID card) is often conducted.

FIG. 1 illustrates an example of conventional ID card 1, which comprises a photographic field 2 having a photograph of an ID card owner, a data field 3 which may be read visually, providing the owner's name, date of birth and ID number, the expiration date of the ID card, and other personal information, and a machine readable data field 4 providing the same data in an adequate manner to be read by a scanner, magnetic card reader, or other conventional data reading devices. For example, it would be possible to form the machine readable field 4 by printing in magnetic ink.

FIG. 2 illustrates an example of a conventional checkpoint security system 11. In this figure, the system 11 comprises a terminal 6 including a CRT display, keyboard 10 connected to the terminal 6, a hard disk drive 7 connected to the terminal 6, a communication line 8, and a remote data base 9 connected to the terminal 6 via the communication line 8.

In this example, suppose that all of the ID card owner's data is stored in the remote data base 9 and a part of the data is transferred to the hard disk drive 7 via the communication line 8 to use the hard disk drive 7 as a distributed data base, if necessary.

When a person desiring entry through the security check point (hereinafter "passer") 5 with an ID card 1 approaches the security point, an examiner or operator 12 first examines the ID card to compare the figure in the photograph field 2, and the passer 5. Then, the examiner 12 reads the contents of the field 3 and decides whether the passer 5 should be allowed to pass or not.

If the examiner 12 has a doubt as to whether the passer 5 and the person shown and described on ID card 1 are the same, the examiner, can enter some identifying data (hereafter "key data"), such as the owner's name, the ID number, or other information which uniquely belongs to the ID card owner and is provided in the data field 3, by means of the key board 10, search corresponding personal data (hereinafter ID data) in the hard disk drive 7 or remote data base 9. If there is no such corresponding ID data in the data bases, the examiner 12 denies entry to the passer 5.

Additionally, it would be possible for the examiner 12 to use a conventional electronic card reader such as an O.C.R. or magnetic card reader (not shown) to enter the key data from the machine readable data field 4.

However, if someone steals an available ID card from the card owner and pastes his own photograph on the ID card, the examiner 12 will have no way to identify the passer 5 because the figure in the photograph field 2 will correspond to the passer 5 even though he is not the real owner, and all of the data in the ID card 1 will exist in at least one of the data bases 7 and 9.

Further, if the system 11 is organized to require the passer 5 to enter a password or some identifying key data which is not described on the ID card 1, it might result in an occurrence that the actual card owner cannot pass because the card owner has forgotten the password or identifying key data.

Further, if the examiner 12 conducts an oral inquiry of every passer using the key data described in the ID card 1, it will require a significant period of time to perform the examinations.

OBJECT AND SUMMARY OF THE INVENTION

An object of the invention is to provide a check point security system which is capable of detecting a replacement of a photograph on an ID card.

A further object of the invention is to provide a check point security system which is capable of examining a passer in a relatively short time.

Another object of the invention is to provide a check point security system which is combined with an automatic gate system.

A still further object of the invention is to provide a check point security system with which the strictness of the examination may be varied.

The system of the invention is applied to a passer having an ID card which includes a photograph of the ID card owner and at least key data for searching registered data of the ID card owner.

The system includes (a) a data base for storing registered data of a plurality of ID card owners, (b) a video camera for capturing the passer's appearance, (c) an optical character reader and an image scanner, (d) a CRT display, and (e) a terminal connected to all of the above elements for controlling the entire system.

The registered data of each of the ID card owners stored in the data base includes at least the person's security level and a photographic image of the person. The terminal reads the key data on the ID card using the optical character reader and searches for corresponding registered data in the data base using the key data. The terminal then retrieves the corresponding data and recognizes the security level in the retrieved data. If the security level exceeds a predetermined security level, the terminal controls the video camera to capture an image of the passer and controls the image scanner to scan the photograph on the ID card to obtain a scan image of the photograph, and further, controls the CRT display to display the image of the passer captured by the video camera, the image of the photograph, and the photographic image of registered ID card owner retrieved from the data base, all on the same screen.

According to the invention, the examiner or operator can compare the three images simultaneously to determine if they are of the same person.

Further, the invention can be combined with a gate system connected to the terminal which is controllable by gate control data input by the operator via a keyboard provided at the terminal.

The invention can further include an optical height measuring device connected to the terminal for measuring the passer's height before performing the image procedure, to determine the height of the passer and compare it with registered height data stored in the data base.

BRIEF DESCRIPTION OF THE DRAWINGS

These and other aspects of the invention may be more completely understood from the following detailed description of the preferred embodiments with reference to the accompanying drawings in which:

FIGS. 3 3A and 3B form a block diagram of a terminal system of a first embodiment of the invention.

DESCRIPTION OF THE PREFERRED EMBODIMENTS

First Embodiment

Figure 5:
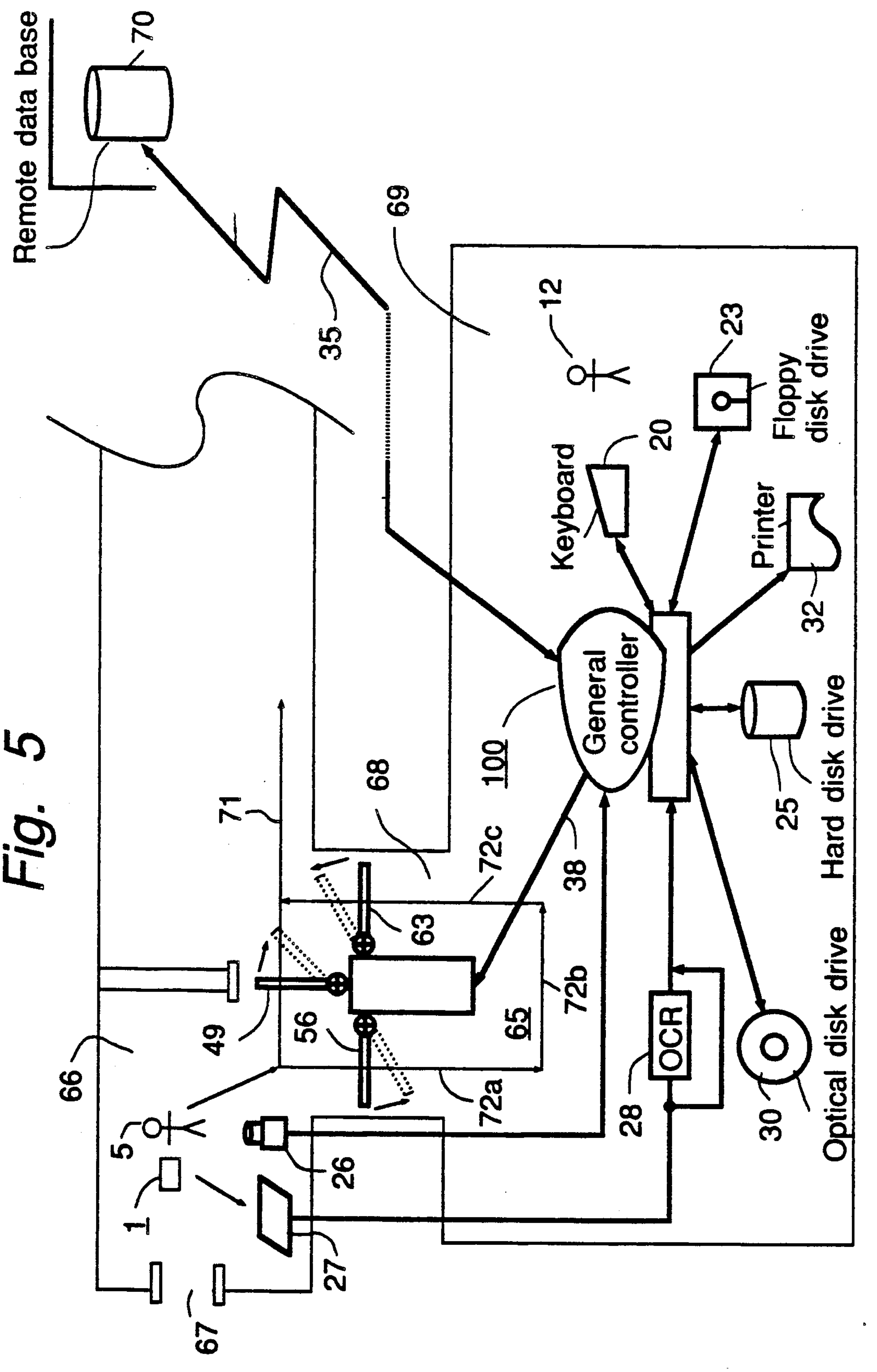
FIG. 5 is a schematic illustration of the first embodiment of the invention.

As shown in FIG. 5, the terminal system 13 is provided in an examination room 69 adjacent to a passageway 66 having an entrance 67. A branch passageway 68 connects passageway 66 to the room 69. Suppose that a passer 5 with an ID card 1 comes from the entrance 67 and requests passageway through the check point to go to the right in FIG. 5 along arrow line 71.

Figure 3A:
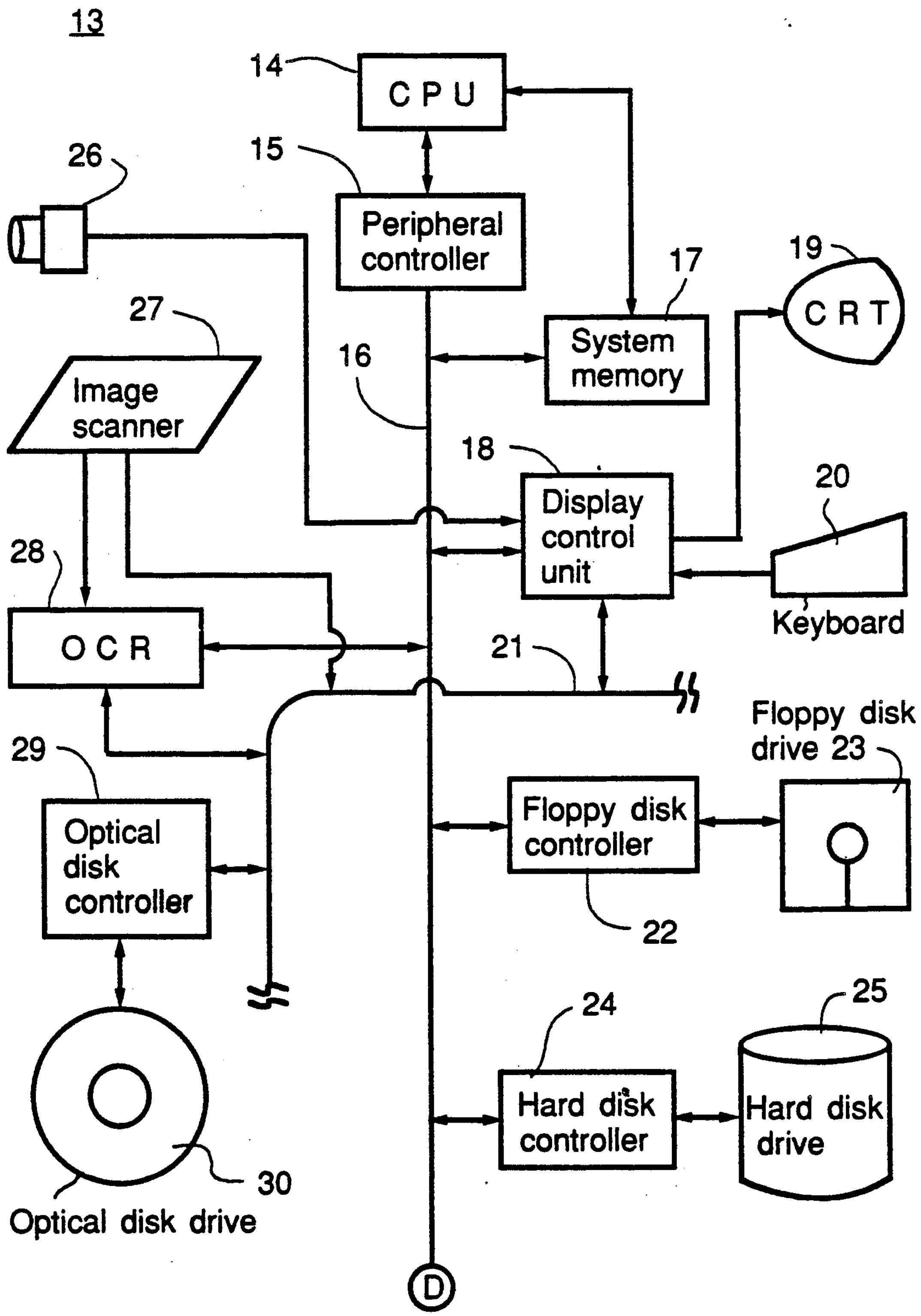

As shown in FIG. 3A, the terminal system 13 comprises a central processing unit (hereinafter CPU) 14, a peripheral controller 15 connected to the CPU 14 for controlling other peripheral devices, and a system memory 17 connected to the CPU 14, for storing control software and data for the entire system. A system bus 16 is provided for connecting other peripheral devices with the CPU 14. A display control unit (hereinafter DCU) 18 is connected to the system bus 16 for controlling a display unit in the form of CRT display (hereinafter CRT) 19. CRT 19 is provided for displaying images of the passer's face, character data on the ID card 1 and registered data stored in a remote data base 70, and has at least 200 dots/inch resolution and sufficient bit depth for displaying the images in tones of gray or in color. A keyboard (hereinafter KB) 20 is provided for inputting key data for searching, and for inputting a control command for gates which will be discussed below. An image data bus 21 is connected to the DCU 18 for transferring image data. A floppy disk controller (hereinafter FDC) 22 is connected to the system bus 16, and is provided for controlling a floppy disk drive (hereinafter FDD) 23 connected thereto for storing data read from ID cards of passers who pass the examination. A hard disk controller (hereinafter HDC) 24, also connected to the system bus 16, is provided for controlling a hard disk drive (hereinafter HDD) 25 connected thereto. A video camera 26 is connected to the DCU 18 for imaging the passer's face. An image scanner 27 is provided for reading the ID card 1. An optical character reader 28 is connected to the image scanner 27 which is in turn connected to image data bus 21, and the system bus 16. Scanner 27 and reader 28 are respectively provided for reading the photo image and key data on the ID card. An optical disk controller 29, connected to the system bus 16, is provided for controlling an optical disk drive 30 which is in turn capable of reading and writing image data of ID card owners authorized to pass through the check point.

Figure 3B:
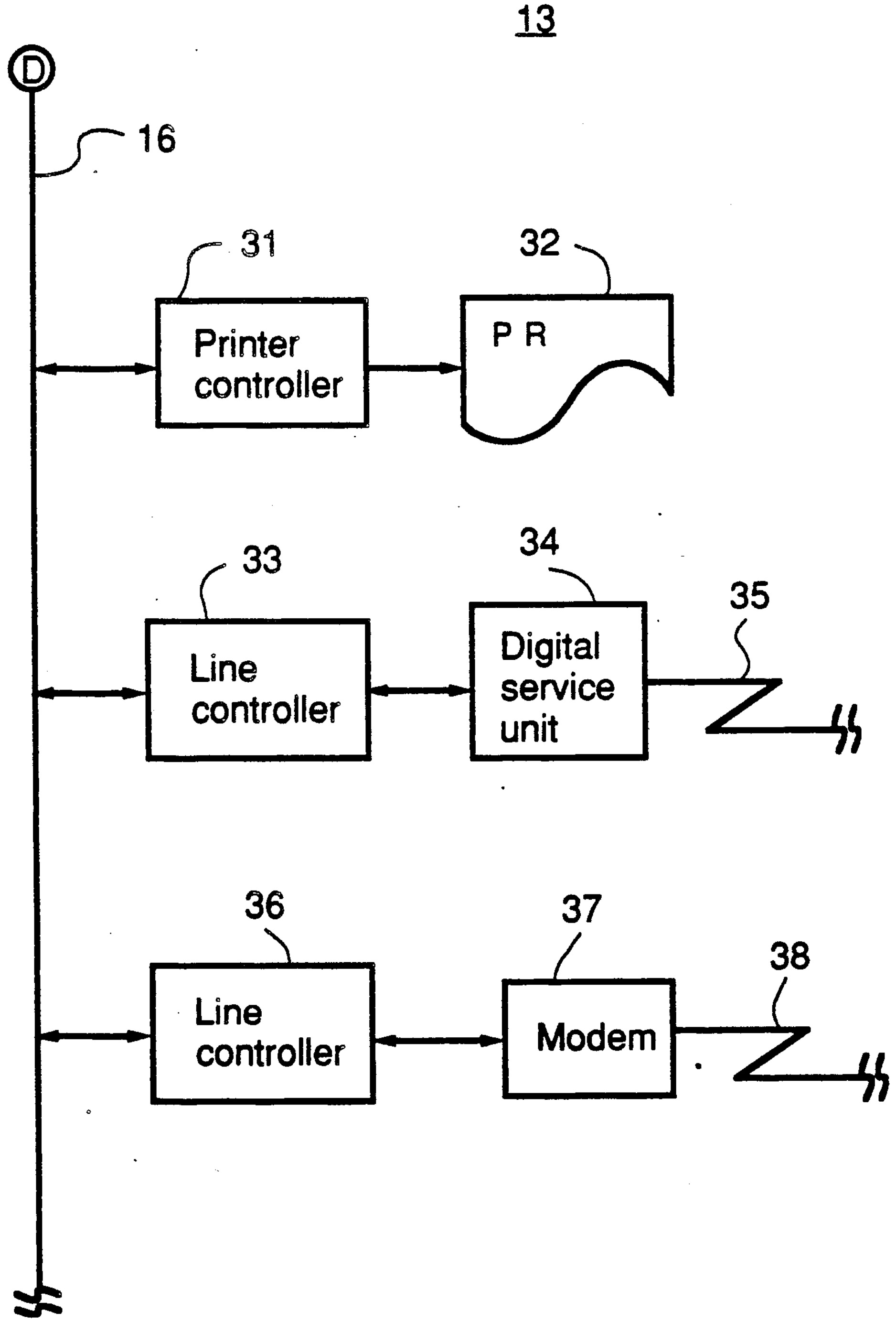

Referring now to FIG. 3B showing a further portion of the terminal system, and which is connected at D to the portion of the terminal system shown in FIG. 3A, a printer controller 31, connected to the system bus 16, is provided for controlling a printer (hereinafter PR) 32 which is used for making a journal of passers who have passed the examination. A first line controller 33, connected to the system bus 16, is provided for controlling a digital service unit (hereinafter DSC) 34 which is used for communicating with a remote data base 70, shown in FIG. 5, via a communication line 35. A second line controller 36, connected to the system bus 16, is provided for controlling a modem 37 which is used for communicating with a gate system 65 shown in FIG. 4, via a communication line 38.

Figure 4:
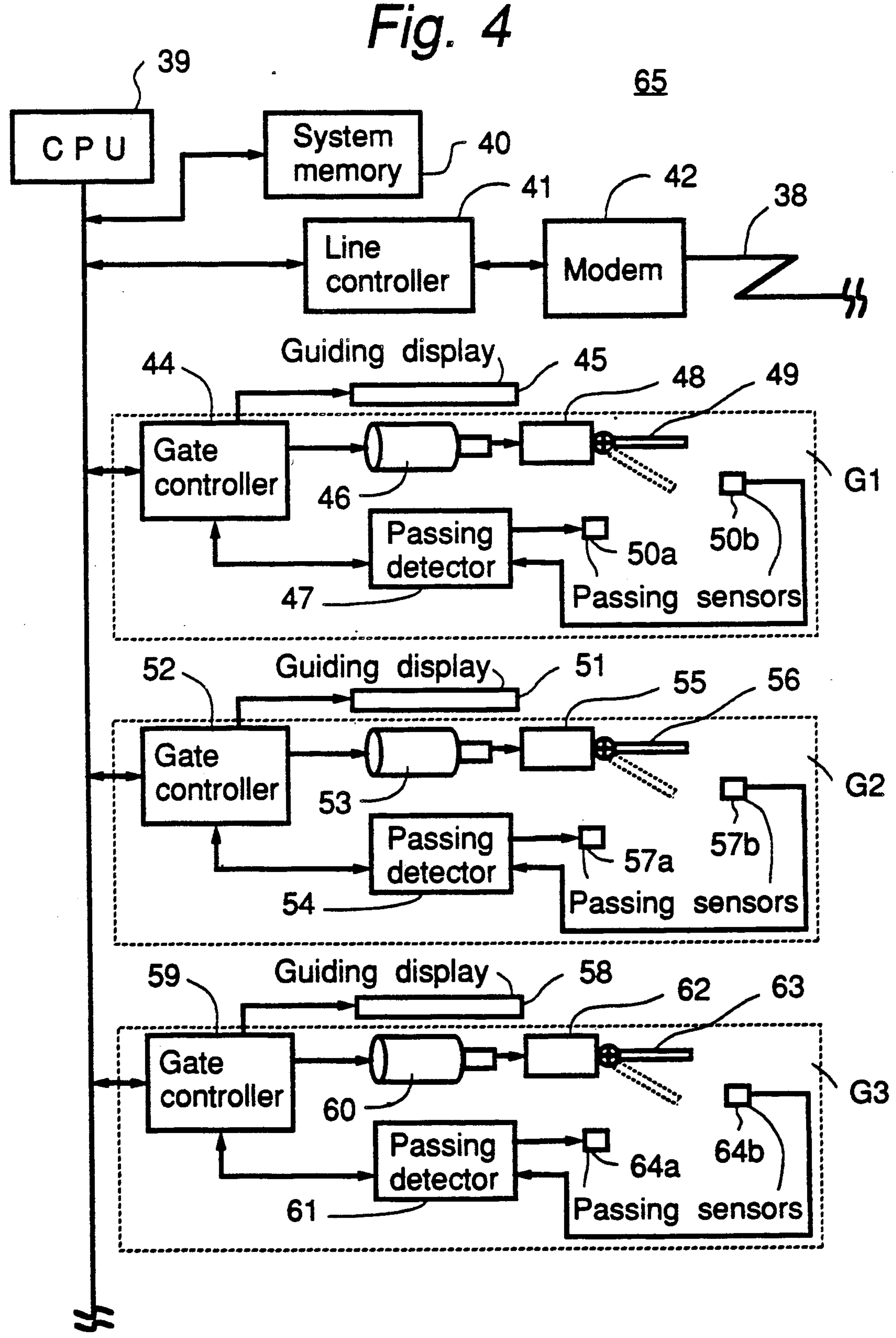
FIG. 4 is a block diagram of a gate system of the first embodiment of the invention.

Further, the terminal system 13 is combined with a gate system 65 shown in FIG. 4 and FIG. 5. As shown in FIG. 4, the gate system 65 comprises a CPU 39 which provides internal control. A system bus 43 connects the CPU 39 to various peripheral devices, three gate units G1, G2 and G3, a system memory 40, and a line controller 41 for a modem 42. The system memory 40 is provided for storing control software used to control the entire gate system with the CPU 39. The modem 42, under the control of the controller 41, provides communication between the gate system 65 and the general control unit 100 (consisting of the various controllers and display shown in FIGS. 3A and 3B) of terminal system and 13, via the communication line 38. The three gate units G1, G2 and G3 are respectively controlled by gate controllers 44, 52, 59 each of which comprises a general purpose microcomputer (not shown). Each gate includes a respective guiding display (45, 51, 58) which is connected to the respective gate controller (44, 52, 54). The respective gate units G1, G2, and G3 include a passing detector (47, 54, 61 comprising a general purpose microcomputer, not shown) connected to the respective gate controller and having respective passing sensors (50*a*, 50*b*; 57*a*, 57*b*; 64*a*, 64*b*), a pulse motor (46 53, 60) connected to the respective gate controller, and a mechanism (48, 55, 62) driven by the pulse motor for opening or closing a ate (49, 56, 63).

The detailed structure and operation of the invention are explained below using the flow charts of FIG. 6A and FIG. 6B.

Figure 1:
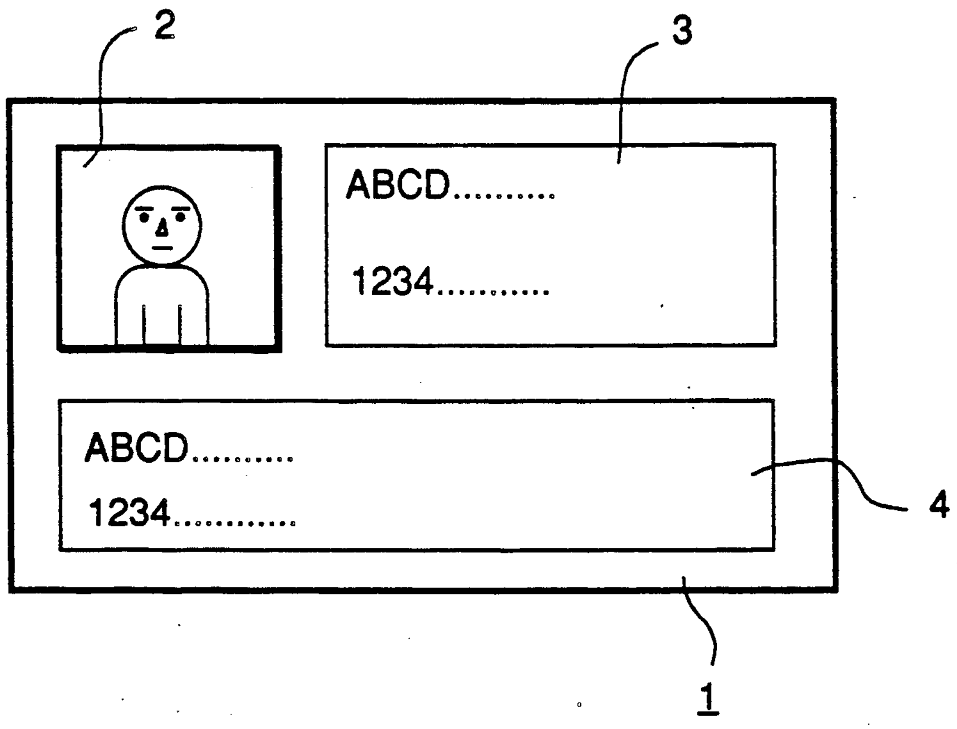
FIG. 1 illustrates an example of a conventional ID card.
Figure 2:
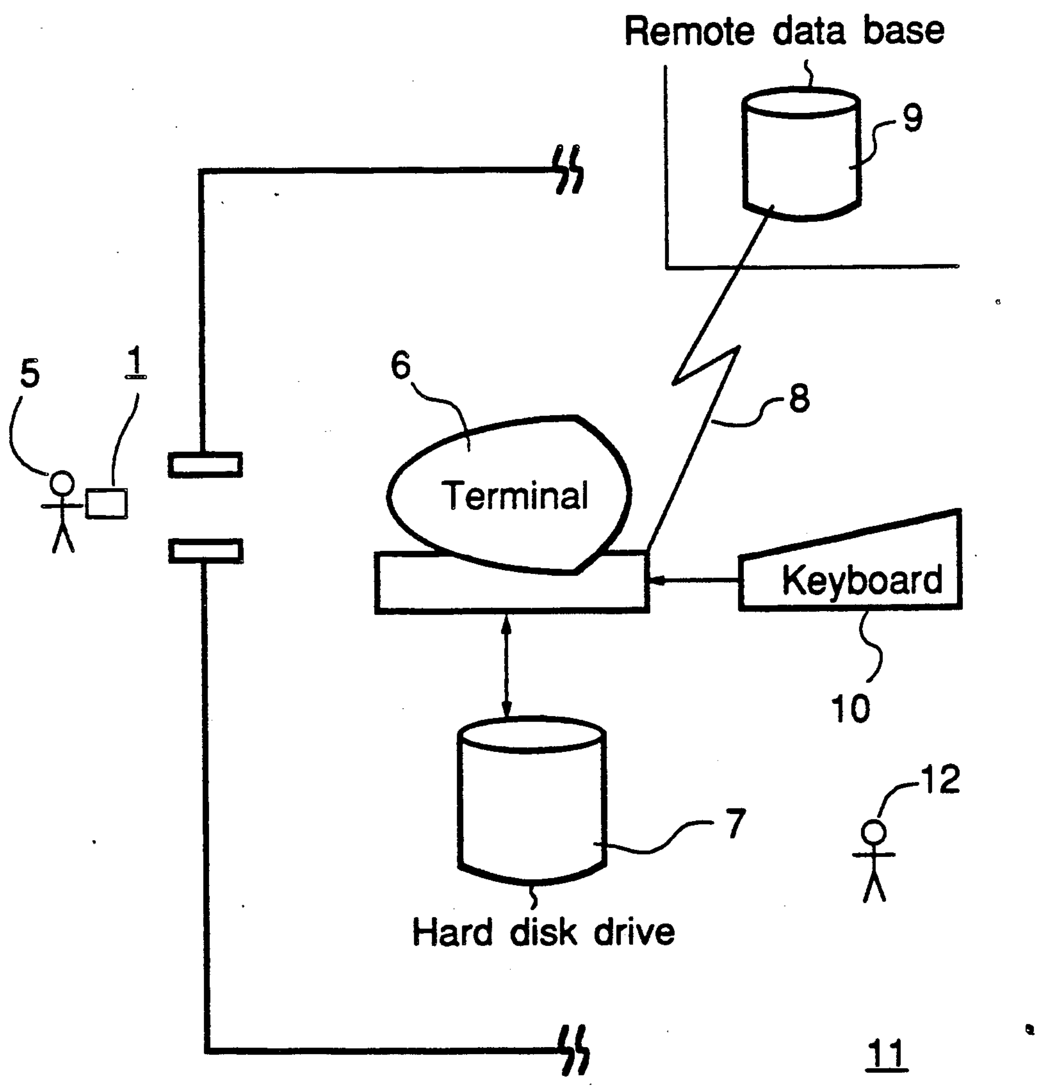
FIG. 2 illustrates an example of a conventional check point security system.

In step S1, a passer 5 sets his ID card 1 (See FIG. 1) on the scanner 27. In step S2, the scanner 27 reads the machine readable data field 4 and sends image data of the data field 4 to the OCR 28. The OCR 28 recognizes character data in the image data of the data field 4 and sends the character data to the CPU 14 via system bus 16. The CPU 14 receives the character data and searches corresponding data in the HDD 25 using the character data as key data for searching (Step S3).

If there exists data in the HDD 25 corresponding to the key data (Step S4), the CPU 14 recognizes the security level of the ID card owner from the corresponding data and based on the security level determines whether the photographic imaging of the passer 5 will be needed or not.

Suppose that the security level data is stored in the remote data base 70 or in the HDD 25 and describes the ID card owner's security level as either "H" (High) or "L" (Low). For example, in a company, an engineer who works in a research laboratory and can access the company's secrets and needs identification to pass through every entrance to his work place might have the high security level "H", but a clerk who works in an office building may not require such a high security level and therefore might have the low security level "L". Further, the security level assigned might depend on the ID card owner's personal background as evaluated prior to entering the security level data in the data base 70.

In this embodiment, the system conducts imaging only if a passer has a security level "H". Further, if necessary, the system of the invention could be programmed to conduct the imaging as to the passers who have the security level "H" or "L". Further, it could be possible to establish several grades of security level, for example level 1 to level 5, and control the system to conduct the video and scan imaging according to the level that the card owner has.

Figure 6A:
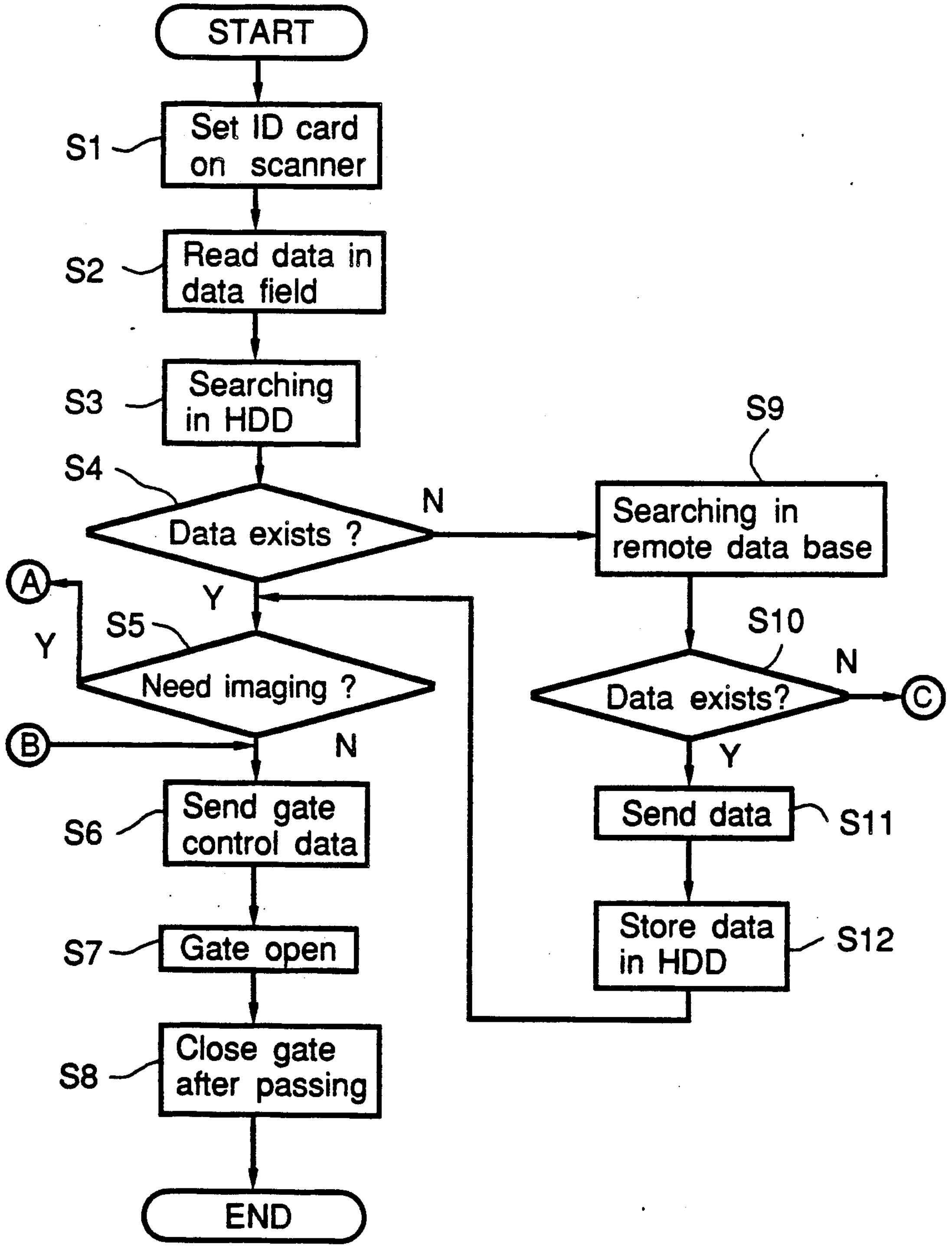
FIG. 6A and FIG. 6B are flow charts for explaining the operation an function of the first embodiment of the invention.
Figure 6B:
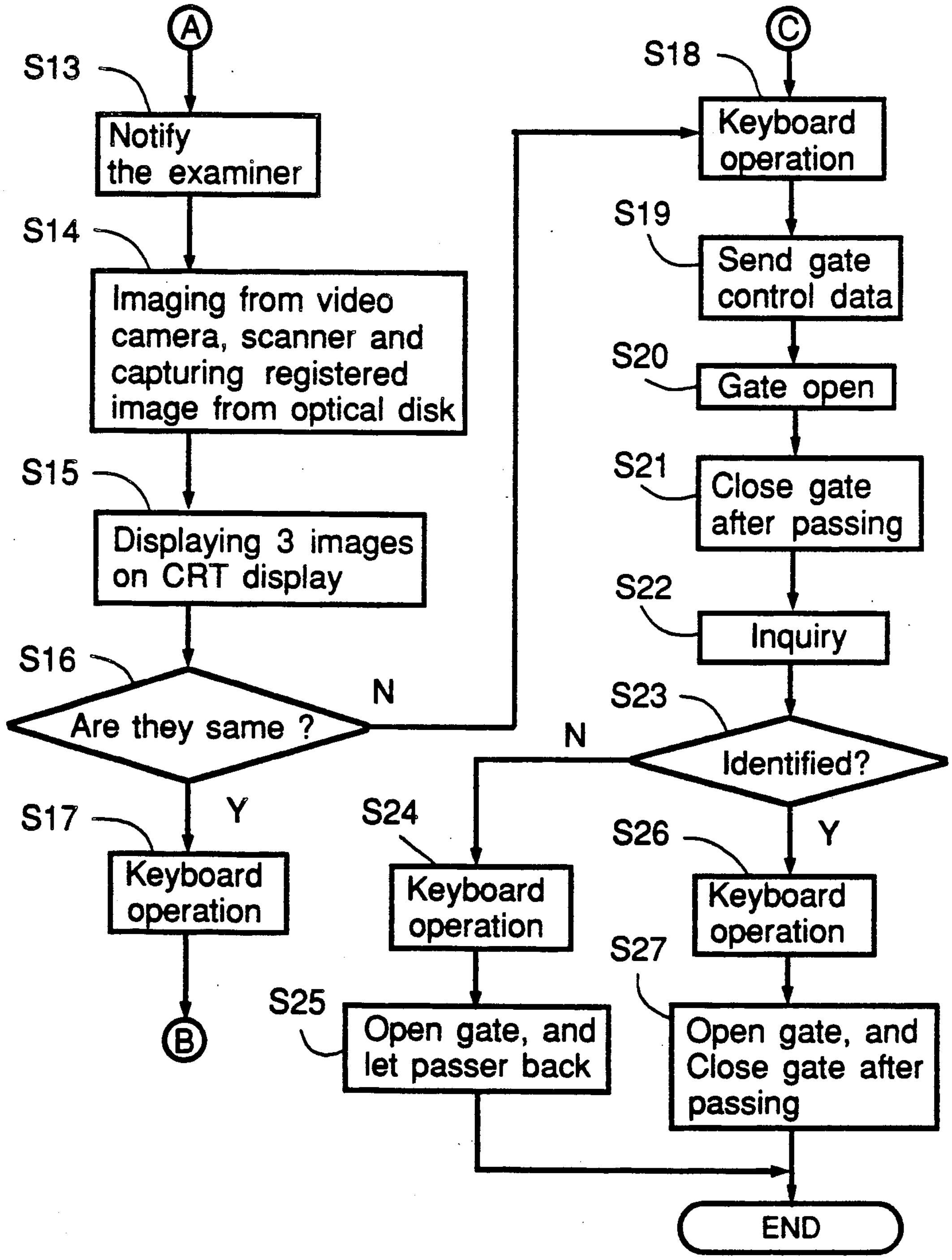

If the card owner has the security level "H", the CPU 14 displays the security level on the CRT 19 to notify the examiner or operator 12 that the face of passer 5 should be imaged (video photographed) (Step 13 in FIG. 6B). Further, via peripheral controller 15, the CPU 14 directs (1) imaging of the passer's face by controlling the video camera 26 with the DCU 18, (2) imaging of the photograph field 2 in the ID card 1 by controlling the scanner 27, and (3) searching for the corresponding figure in the optical disk drive 30 using the key data (Step S14). As shown in FIGS. 3A and 5, in the case of imaging the photographic field 2, the image data detours the OCR 28 to increase the transfer speed. Further, if the images of the faces of all card owners have been stored in the data base 70, these images can be transferred to the optical disk drive 30 as a distributed data base, from where the image corresponding to the key data together with the data from image scanner 27 and video camera 26 can be called up onto the CRT 19 via image data bus 21.

Figure 7:
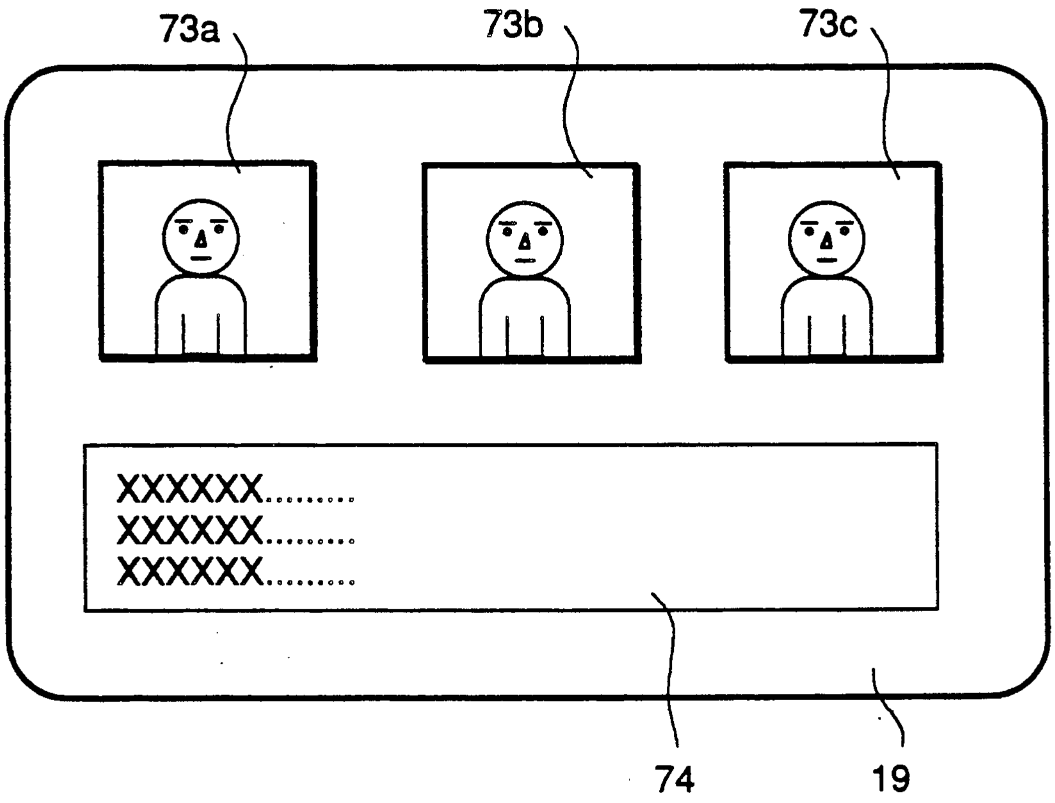
FIG. 7 illustrates an example of displayed images on a display screen of the invention.

The CPU 14 can thus display on the CRT 19 the three images 73*a*, 73*b* and 73*c* respectively of the scanned image of the photograph of the photographic field 2 on the ID card 1, the image captured by the video camera 26, and the image retrieved from data base 70 and now stored on optical disk 30, as shown in FIG. 7. A display field 74 on CRT 19 includes all of the card owner's registered data held in the data base 70.

Figure 8:
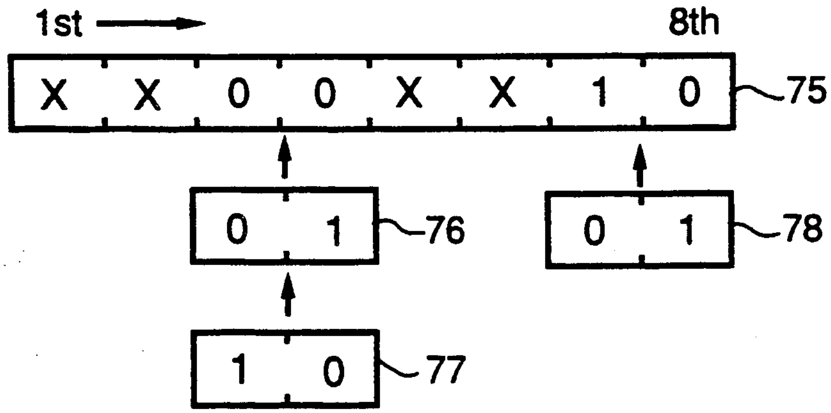
FIG. 8 illustrates an example of gate control data utilized by the invention.

The examiner 12 compares the three images (Step S16) and if the examiner concludes that the images are those of the same person, the examiner enters instructions consisting of an eight bit binary number, in this case via the KB 20 (Step S17), to the CPU 14 to read gate control data 75 as shown in FIG. 8, from the system memory 17 and send it to the gate system 65 (Step 6 in FIG. 6A).

As shown in FIG. 8, the gate control data comprises eight binary bits of data 75. In the gate control data 75, a third bit and a fourth bit are used to distinguish the gate units G1, G2, and G3. For example, "00" in the data 75 identifies the gate unit G1, "01" (denoted by reference number 76) identifies the gate unit G2, "10" (denoted by reference number 77) identifies the gate unit G3. Further, a 7th bit and an 8th bit are used to command "open gate" if the gate is to be opened or to notify "closed gate" if the gate has been closed. For example, "10" in the data 75 designates "open gate" and "01" (denoted by reference number 78) designates "closed gate". In the eight bits of data 75, "X" means an unnecessary bit. In this case, the CPU 14 sends "XX00XX10" to the gate system 65 via the communication line 38 and the CPU 39 receives the data and actuates the gate controller 44. The gate controller 44 controls the guiding display 45 which is provided adjacent to the gate 49 to display "Go straight", and controls the pulse motor 46 to drive the gate mechanism 48 to open the gate 49 (Step S7).

After that, the passer 5 passes through the gate 49 and proceeds in the direction of the arrow line 71 in FIG. 5.

The passing sensors 50*a*, 50*b* are provided adjacent to the gate 49 to sense, and notify passing detector 47 of the passage of the passer 5. If the passing detector 47, it detects that the passer has passed the passing detector 47 notifies the CPU 39. When the CPU 39 is notified of the passing or a predetermined period of time expires without the CPU being notified of a passing (the CPU 39 measures the time after directing the gate controller 44 to open gate 49), the CPU 39 directs the gate controller 44 to close the gate 49 and to turn off the guiding display 45, and using notification data in the form of the eight bit number 78 ("XX00XX01") notifies the CPU 14 via the communication line 38 that the passer 5 has passed safely through the gate 49 and the gate has been closed.

If the CPU 14 receives the notification data, the CPU 14 initializes the entire terminal system 13 to prepare for examination of the next passer.

If there is no corresponding data in step S4 in FIG. 6A, the CPU 14 sends the data read from the ID card 1 to the remote data base 70 and requests further searching in the remote data base 70 (Step S9). If there is corresponding data in the remote data base 70, the remote data base 70 sends the data to the terminal system 13 (Step S11) and the CPU 14 stores the corresponding data to the HDD 25 (Step S12).

If there is no corresponding data even in the remote data base 70, the remote data base 70 notifies the terminal system 13 and the terminal system 13 displays the notification on the CRT 19. Then the examiner 12 enters instructions on the KB 20 (Step S18) for the CPU 14 to send the gate control data 76 ("XX01XX10") to the gate system 65 (Step S19).

The gate system 65 receives the data 76 and directs the gate controller 52 to open the gate 56 and to display "Go into the examination room" on the guiding display 51 provided adjacent to the gate 56 (Step S20).

The passer 5 goes into the examination room 69 by passing in the direction indicated by arrow line 72*a* in FIG. 5. Then, the passing sensors 57*a*, 57*b* detect the passing of passer 5 and the gate 56 closes automatically (Step S21) as in the manner described above with regard to gate 49.

In the examination room 69, the examiner conducts an oral inquiry of the passer 5 using the data provided on the ID card 1 (Step S22). If the examiner cannot identify the passer 5, he rejects entry by the passer, and enters instructions on the KB 22 to open the gate 56 and to display "REJECTED" on the guiding display 51 and direct the passer back toward to entrance 67 of passageway 66 (Step S25).

If the examiner is able to identify the passer 5 as the owner of the ID card 1, he enters instructions on the KB 20 (Step S26) to open the gate 63 and to display "Enter" on the guiding display 58 provided adjacent to the gate 63. Then, the passer 5 can enter the passageway 66 along the path shown by arrow lines 72*b*, 72*c*.

After that, the gate 63 closes automatically as in the manner described above with regard to gate 49 (Step S23).

If the examiner cannot identify the three images displayed on the CRT 19 in the step S16, the examiner enters instructions on the KB 20 (Step S18) to initiate the above described steps S18 to S27.

According to the first embodiment described above, if the ID card has been tampered with to replace the original photograph, this can be detected easily by the image comparison (at Step S16) performed by the examiner 12.

Second Embodiment

Figure 9:
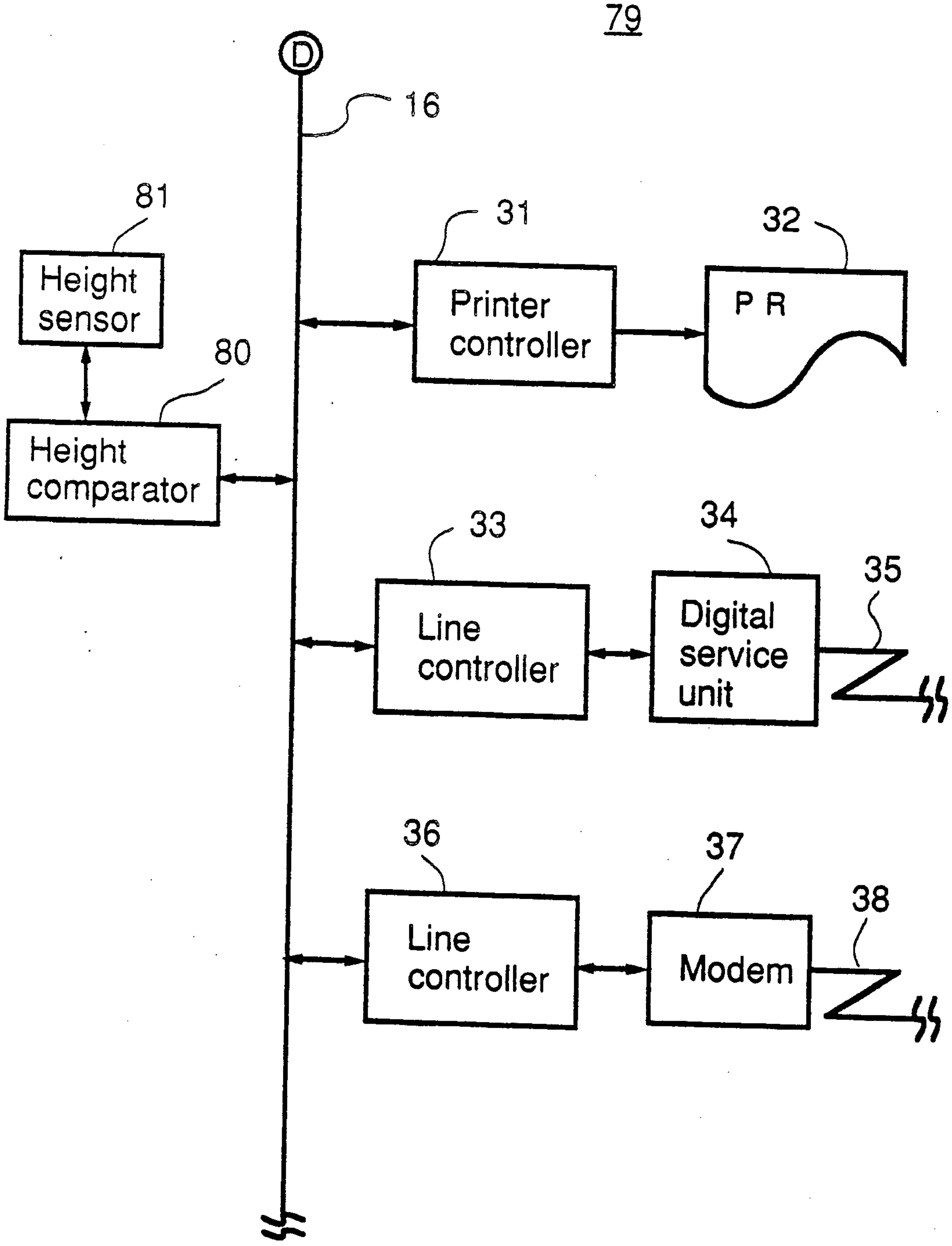
FIG. 9 illustrates modifications of the terminal system according to a second embodiment of the invention.

FIG. 9 is a block diagram of a modified part of terminal system 79 of a second embodiment of the invention which is connected to FIG. 3A at D. In the second embodiment, elements similar to those in the first embodiment of FIGS. 3A and 3B are designated with the same reference numbers in FIG. 9, and there are no changes in the gate system 65 illustrated in FIG. 4 and another part of the terminal system, illustrated in FIG. 3A.

Figure 10:
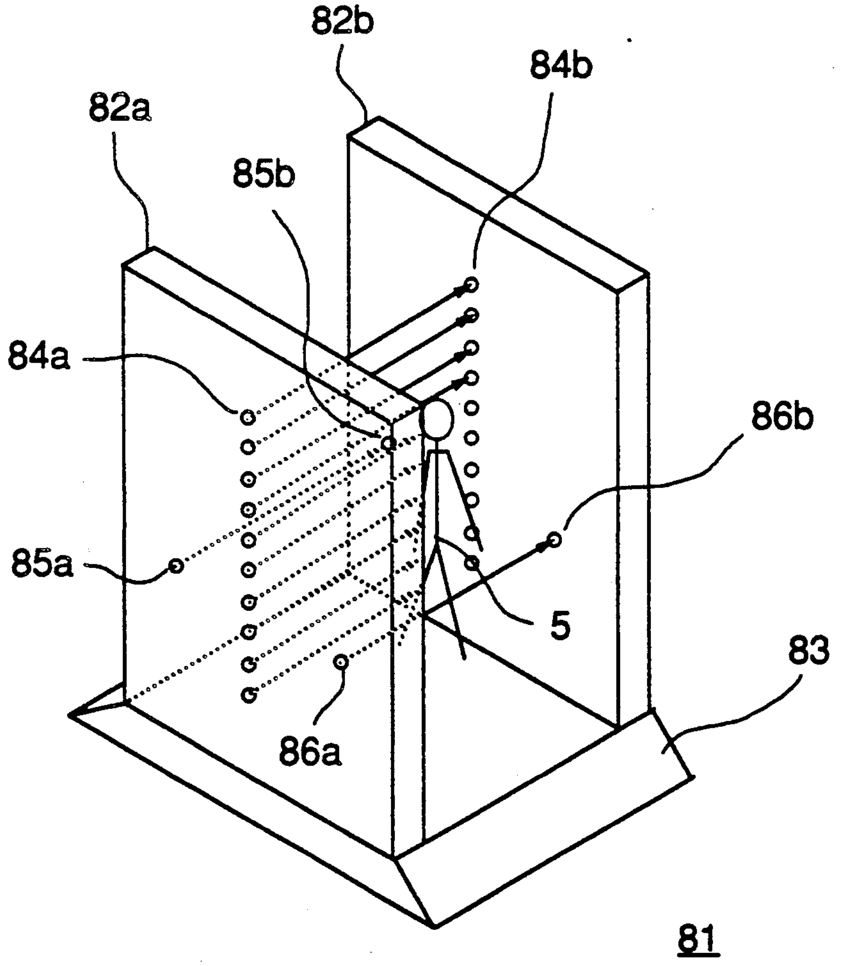
FIG. 10 illustrates a height sensing device used in the second embodiment of the invention.
Figure 13:
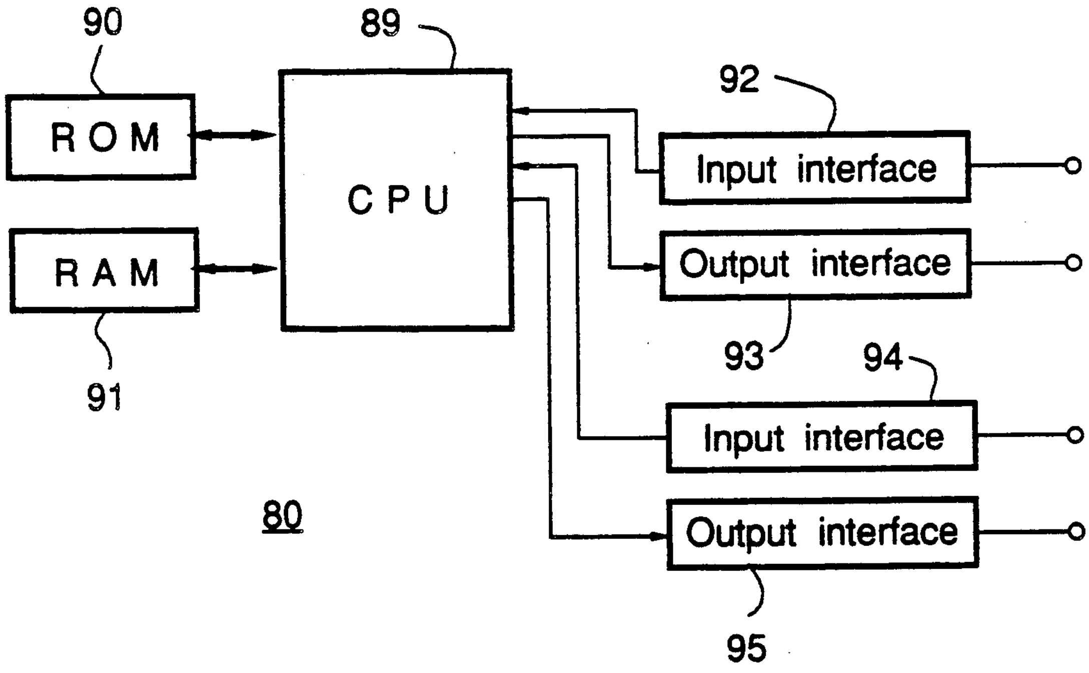
FIG. 13 is a block diagram of a height comparator in accordance with the second embodiment of the invention.

The differences between the first and second embodiments are in the control software in the system memory 17 and the use in the second embodiment of and a height sensing device 81 and a height comparator 80 as illustrated in FIG. 9B. The detailed structure of the height sensing device 81 is illustrated in FIG. 10 and the detailed structure of the height comparator 80 is illustrated in FIG. 13.

Figure 11:
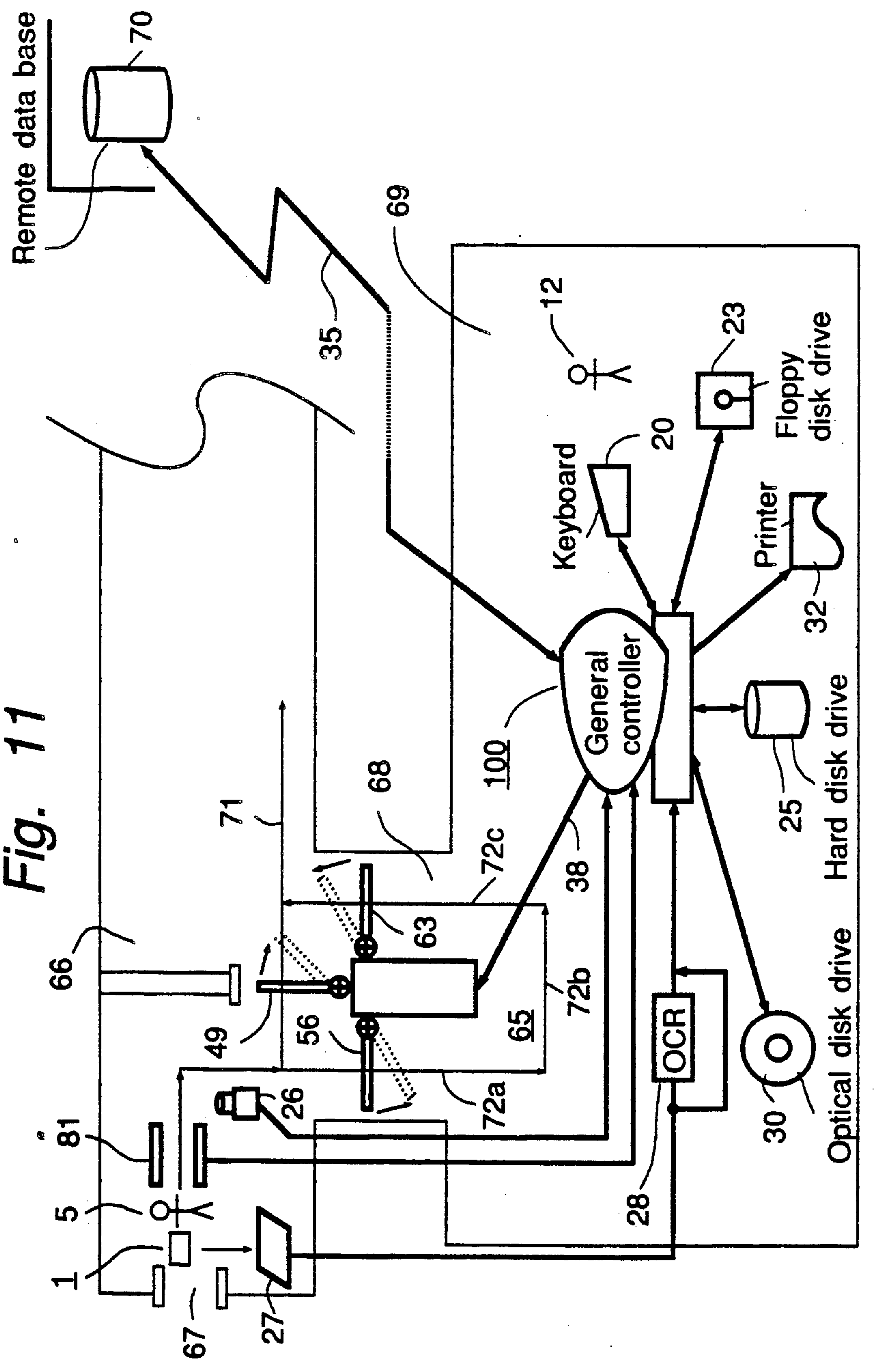
FIG. 11 is a schematic illustration of the second embodiment of the invention.

Further, FIG. 11 is a schematic illustration of the second embodiment of the invention. In this figure, the same reference numbers denote similar elements in FIG. 5.

Figure 12A:
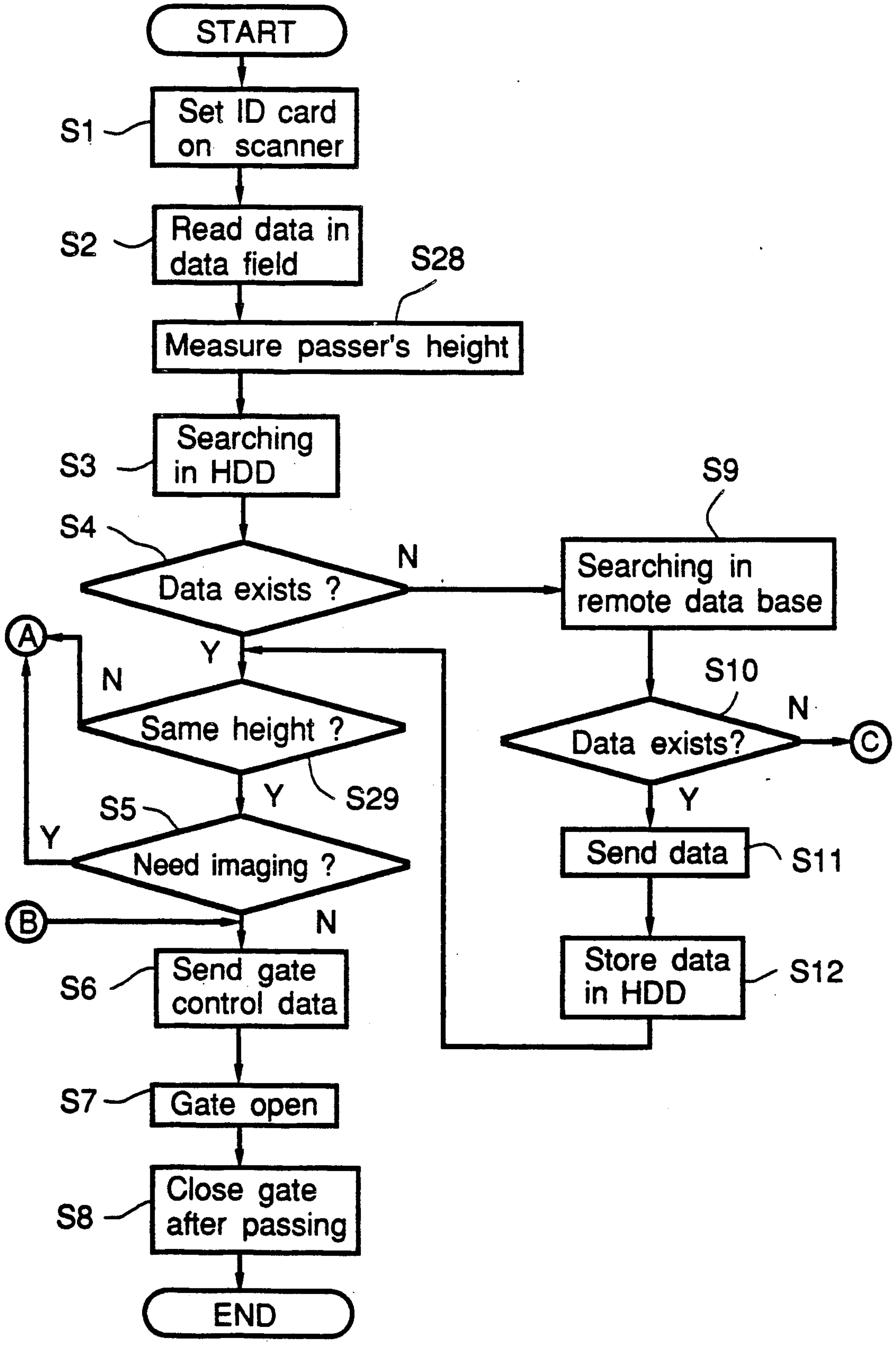
FIG. 12A and FIG. 12B are flow charts for explaining the operation and function of the second embodiment of the invention.
Figure 12B:
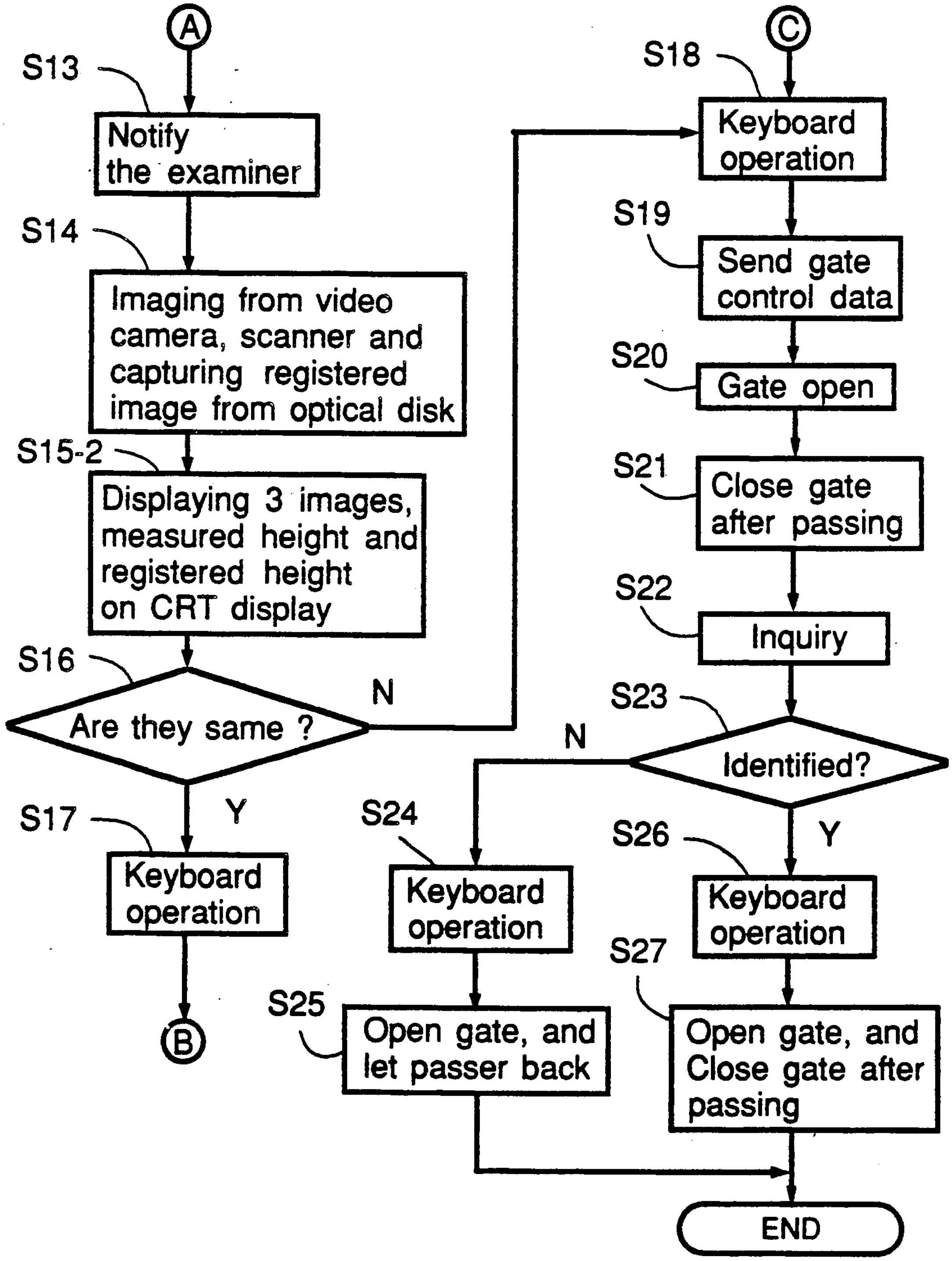

Further, FIG. 12A and FIG. 12B show a flow chart of the operation and function of the second embodiment of the invention. Steps having the same step numbers as described in FIG. 6A and FIG. 6B are substantially the same. The modified steps or new steps have new step numbers.

In the second embodiment of the invention, an optical height measure 81 is provided adjacent to the scanner 27 in the passageway 66 to further identify the passer 5.

As shown in FIG. 10, the height sensing device 81 comprises a base 83; side walls 82*a* having a series of light beam generating lamps 84*a*, such as LEDs, arranged in a vertical line with a predetermined spacing, for example 200 amps at 1 cm intervals; and an opposing side wall 82*b* having a series of light detecting devices 84*b*, such as photo transistors, arranged in a vertical line with the same predetermined spacing as the line of lamps 84*a*, to receive the respective light beams from the lamps 84*a*.

Further, these walls have two pairs of sensors 85*a*, 85*b* and 86*a*, 86*b* (which may be photo sensors similar to the lamps 84*a* and light detectors 84*b*) to detect that the passer 5 is in a proper position for the height measurement to be made.

The operation of the second embodiment of the invention will now be explained in detail with reference to the flow charts of FIG. 12A and FIG. 12B.

In steps S1 and S2, the ID card 1 of the passer 5 is placed on the scanner 27 and the scanner reads data from data field 4 in the same manner as described in the first embodiment. In the second embodiment, however, the data field 4 includes the height of the ID card owner, which is also registered in the data base 70 when the ID card is issued.

Then, after removing shoes and any hat, the passer 5 walks into the height sensing 81 device and through the light beams between the photo sensors 85*a* and 85*b*.

As shown in FIG. 13, the height comparator 80 comprises a general purpose microcomputer having a CPU 89, a read only memory (hereinafter ROM) 90 including control software for performing the height measurement, a random access memory (hereinafter RAM) 91 for storing a measurement result, and an output interface 93 for driving the photo sensors 85*a*, 85*b* and 86*a*, 86*b*, the lamps 84*a* and the light receiving devices 84*b*. Also provided are an input interface 92 for receiving a result of the height sensing by light receiving 15 device 84*b* and the position sensing by the photo sensors, an input interface 94 and an output interface 95 connected to the system bus 16 to provide communication with the CPU 14.

When the height comparator 80 in FIG. 9B, which is watching the photo sensor 85*a*, 85*b*, detects the crossing, the height comparator 80 activates the lamps 84*a* and light receiving devices 84*b* to start height sensing. In particular, the height comparator 80 activates the lamps 84*a* and succeedingly scans the light receiving devices 84*b* from the bottom to the top of the line in a predetermined time sequence.

For example, suppose that the height of the passer 5 is 169 cm, and the 200 lamps 84*a* and the 200 light receiving devices 84*b* are provided at 1 cm intervals from 0 cm to 200 cm. In this case, the light of 169 lamps from the bottom are shaded by the passer 5. The height comparator 80 can count the number of the shaded light receiving devices 84*b* to obtain the actual height of the passer 5. The height comparator 80 stores that number in its RAM 91.

After the height measurement, the terminal system 13 performs steps S3 and S4. The steps which are performed if the data read from the ID card 1 does not exist in the data base 70, such as steps S9 to S12 and S18 to S27, are the same as described above with regard to the first embodiment.

In this second embodiment, the terminal system 13 performs a Step S29 for comparing the measured height of the passer and a registered height of the ID card owner. It would be possible not to record the registered height on the ID card 1, rather only record it in the data base 70, in order to discourage disclosure of the card owner's true height to a potential forger.

In either case, in Step S29 the CPU 14 reads the measured height from the RAM 91 in the height comparator 80, and compares it with the recorded height data (from either the ID card 1 or the data base 70).

If the height data are different, i.e., are not within in a predetermined margin, for example, 1 to 3 cm, the terminal system conducts the imaging procedure described above with respect to the first embodiment (Steps S13 and S14).

Further, the CPU 14 directs the DCU 18 to display the three images as explained in the above description of the first embodiment, and additionally, to display the actual height and the registered height in the display field 74 of FIG. 7 (Step S15-2).

The examiner 12 compares the three images, and the measured height and registered height (Step S16). If the examiner 12 recognizes that the difference between the measured actual height and the registered height can be explained by other than that the passer is not the card owner, (for example, a change in hair style) and the faces appear to be of the same person, the examiner so instructs the CPU 14 on the KB 20, and the passer is allowed to pass through the gate 49. (Steps S17, S6, S7, S8).

On the other hand, even if the comparison reveals that the passer 5 has the same height as the registered height (Step S29), the imaging procedure will be performed in the same manner as is described above with respect to the first embodiment of the invention (Step S5 and the steps which follow.

Figure 14:
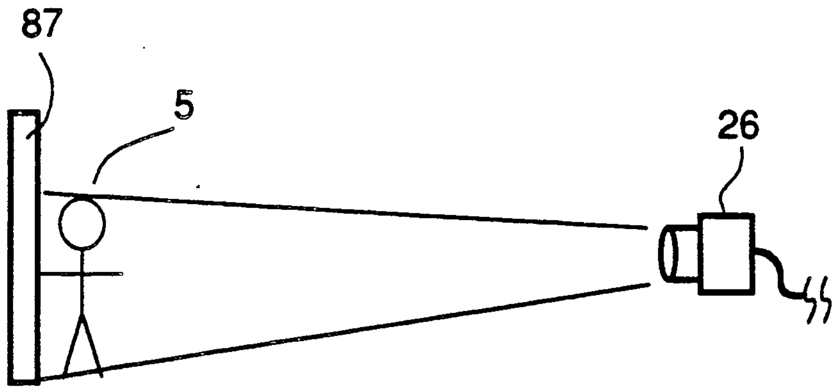
FIG. 14 illustrates another example of the height sensing device using a video camera, in accordance with the second embodiment of the invention.
Figure 15:
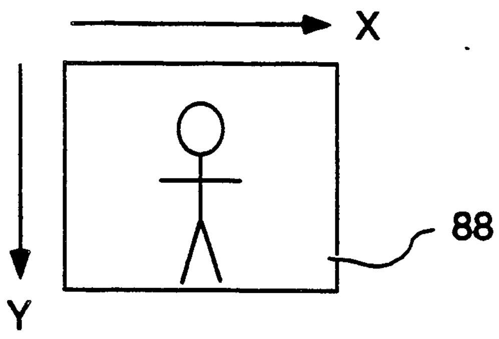
FIG. 15 is a drawing for explaining the operation of the height sensing device illustrated in FIG. 14.

FIG. 14 and FIG. 15 illustrate another way to measure the passer's height in the second embodiment of the invention. The passer 5 stands in front of a white wall 87 and the video camera 26 captures an image of the entire figure of the passer 5. This image is transferred to the DCU 18 and further transferred to the height comparator 80.

In the height comparator 80, the captured image is stored in the RAM 91 as a logical X-Y plane 88 as shown in FIG. 15, and the CPU 89 scans the data in both the X-direction and the Y-direction. As a result, the CPU 89 can recognize the location of the passer's image in its RAM 91 and recognize the address distance between the top of the passer's image and the bottom of the passer's image. The CPU 89 can compute the actual passer's height in a conventional way using the address distance. The CPU 89 will use the result of the computation as the actual passer's height in the above described subsequent steps in use of the above described second embodiment of the invention.

In the second embodiment, since the system performs the height measurement before performing any imaging, it can examine all passers, including those with a low security level, in an additional manner. The second embodiment is therefore particularly desirable in a case in which there are many more passers who have the low security level than passers who have the high security level.

Further, in both the first and the second embodiment, it would be possible to make data other than the security level data, for example, the key data as a start trigger (triggering means) for starting the imaging of the photograph of the field 2 on the ID card 1 and capturing passer's image by means of the video camera 26. In that case, the invention would perform a strict examination of all passers.

It will be understood that the above description of the present invention is susceptible to various modifications, changes and adaptations, and the same are intended to be comprehended within the meaning and range of equivalents of the appended claims.

What is claimed is:

1. A system for examining a passer desiring to pass through a security check point, the passer possessing an ID card having thereon a photograph of the ID card owner and at least key data for searching registered data of the ID card owner, the system comprising:

(a) data base means for storing registered data of a plurality of ID card owners, the registered data for each ID card owner including a designation of one of a plurality of security levels and an image of the ID card owner;

(b) a video camera means for capturing an image of the passer and outputting a video signal representing the passer's image;

(c) means for reading the key data on the ID card, and for scanning the photograph on the ID card to obtain a scan image, said means for reading and scanning including means for outputting the key data and the scan image as electronic signals;

(d) display means for simultaneously displaying three images including the scan image, the passer's image and the image of the ID card owner stored in said data base means; and (e) control means, connected to the data base means, the video camera means, the means for reading and scanning, and the display means, for:

(e1) receiving the key data from the reading and scanning means and searching for and retrieving corresponding data in the data base means using the key data, (e2) recognizing the security level of the ID card owner in the retrieved corresponding data, (e3) retrieving the card owner's image from said data base means in response to recognition in step e2 of one of a subset of the plurality of security levels which excludes at least one of the plurality of security levels of the ID card owner, (e4) controlling the reading and scanning means in response to the recognition of the one of the subset of the plurality of security levels, to scan the photograph on the ID card, and output the scan image to said display means, (e5) receiving the video signal output from the video camera means and directing the video signal to said display means, and (e6) in response to the recognition of the one of the subset of the plurality of security levels, controlling the display means to display the three images simultaneously;

whereby an operator of the system can compare the three images.

2. A system according to claim 1, wherein the ID card further includes registered height data and said system further comprises a height measuring means, connected to the control means, for measuring the passer's height; said control means further comprising means for comparing the measured passer's height and the registered height data and means for controlling the display means to display both the measure height and the registered height.

3. A system according to claim 2, wherein said system further comprises:

a gate means and an input means connected to the control means, for inputting a control command of the operator;

said control means comprising means, responsive to the control command input by the operator, for controlling said gate means.

4. A system according to claim 1, wherein said system further comprises:

a gate means; and an input means connected to the control means, for inputting a control command of the operator;

said control means comprising means, responsive to the control command input by the operator, for controlling said gate means.

5. A system as in claim 1, wherein said display means comprises a single display unit and said control means comprises means for controlling the display means to display the three images on said single display unit.

6. A system as in claim 1, wherein said display means comprises a CRT, said control means comprising means for controlling said CRT to simultaneously display the three images on a single screen.

7. A system for examining a passer desiring to pass through a security check point, the passer having an ID card including a photograph of the ID card owner, a designation of a security level of a corresponding ID card owner, the security level selected from among a plurality of possible security levels, and at least key data for searching registered data of the ID card owner, the system comprising:

(a) data base means for storing registered data of ID card owners, the registered data including images of the ID card owners;

(b) a video camera means for capturing an image of the passer and outputting a video signal representing the passer's image;

(c) means for reading the key data and the designation of a security level on the ID card, and for scanning the photograph on the ID card to obtain a scan image, said means for reading and scanning including means for outputting the key data and the scan image as electronic signals;

(d) display means for simultaneously displaying three images including the scan image, the passer's image and the image of the ID card owner stored in said data base means;

(e) an input means for inputting a control command of an operator of the system;

(f) gate means, responsive to the control command input by the operator, for controlling a physical barrier to passage through the security check point; and (g) control means, connected to the data base means, the video camera means, the means for reading and scanning, the display means, the input means, and the gate means for:

(g1) controlling the means for reading and scanning to read the key data, obtaining the key data from the means for reading and scanning, and searching for and retrieving corresponding data in the data base means using the key data, (g2) controlling the means for reading and scanning to read the designation of security level, (g3) recognizing the security level, (g4) upon recognition of the security level as one of a subset of the possible security levels which excludes at least one of the possible security levels:

controlling the means for reading and scanning to scan the photograph on the ID card, thereby to obtain the scan image, to provide the scan image to the display means, and controlling the video camera means to capture an image of the passer and to provide the image of the passer to the display means, and (g5) controlling the display means to display the three images simultaneously, and (g6) sending the control command input by the operator to the gate means;

whereby the operator can compare the three images and can control the gate means according to a result of the comparison.

8. A system as in claim 7, wherein said display means comprises a single display unit, said control means comprising means for controlling the display means to display the three images on said single display unit simultaneously.

9. A system as in claim 8, wherein said display unit comprises a CRT, said control means comprising means for controlling said CRT to simultaneously display the three images on a single screen.

10. A system for examining a passer desiring to pass through a security check point, the system adapted to read ID cards identifying corresponding ID card owners, each ID card containing an image of an ID card owner and card data for the ID card owner, the card data including key data for searching registered data for the ID card owner, the system comprising:

(a) means for storing registered data separately for each ID card owner, the stored registered data including both a stored image and non-image data of the ID card owner, wherein for selected ID card owners, a triggering means is provided in the non-image data;

(b) video camera means for capturing an image of the passer and outputting a video signal representing the passer's image;

(c) means for reading the card data and the image contained by an ID card, said reading means including means for outputting the card data and the read image as electronic signals;

(d) means for displaying the read image, the passer's image and the stored image; and (e) control means, connected to the storing means, the video camera means, the reading means, and the displaying means, for:

(e1) receiving the key data from the reading means and searching for and retrieving the stored non-image data corresponding to the key data, (e2) detecting the triggering means;

(e3) in response to a detection of the triggering means, controlling said reading means to read the image contained by the ID card and outputting the read image to said displaying means;

(e4) in response to the detection of the triggering means, retrieving the stored image and directing the retrieved image to said displaying means, (e5) receiving the video signal output from the video camera means and directing the video signal to said displaying means, and (e6) controlling the displaying means to display the read image, the video signal, and the retrieved image, whereby an operator of the system can compare the three images;

the registered data including a designation of a security level of the card owner selected from among a plurality of possible security levels, said control means recognizing the security level of the card owner from said designation, the retrieved designation forming the triggering means if the security level of the ID card owner is one of a subset of the possible security levels which excludes at least one of the possible security levels.

11. A system according to claim 10, wherein the image contained by the ID card is a photograph and said reading means includes means for scanning the photograph to obtain electronic signals forming the read image.

12. A system according to claim 10, wherein the image contained by the ID card is a photograph and said reading means includes means for scanning the photograph to obtain electronic signals forming the read image.

13. A system for examining a passer desiring to pass through a security check point, the system adapted to read ID cards identifying corresponding ID card owners, each ID card containing an image of an ID card owner and card data for the ID card owner, the card data including key data for searching registered data for the ID card owner, the system comprising:

(a) means for storing registered data separately for each ID card owner, the stored registered data including both a stored image and non-image data of the ID card owner, wherein for selected ID card owners, a triggering means is provided in the card data;

(b) video camera means for capturing an image of the passer and outputting a video signal representing the passer's image;

(c) means for reading the card data and the image contained by an ID card, said reading means including means for outputting the card data and the read image as electronic signals;

(d) means for displaying the read image, the passer's image and the stored image; and (e) control means, connected to the storing means, the video camera means, the reading means, and the displaying means, for:

(e1) receiving the key data from the reading means and searching for and retrieving the stored non-image data corresponding to the key data, (e2) detecting the triggering means;

(e3) in response to a detection of the triggering means, controlling said reading means to read the image contained by the ID card and outputting the read image to said displaying means;

(e4) in response to the detection of the triggering means, retrieving the stored image and directing the retrieved image to said displaying means, (e5) receiving the video signal output from the video camera means and directing the video signal to said displaying means, and (e6) controlling the displaying means to display the read image, the video signal, and the retrieved image, whereby an operator of the system can compare the three images the registered data including a designation of a security level of the card owner selected from among a plurality of possible security levels, said control means recognizing the security level of the card owner from said designation, the retrieved designation forming the triggering means if the security level of the ID card owner is one of a subset of the possible security levels which excludes at least one of the possible security levels;

the card including a designation of a security level of the card owner selected from among a plurality of possible security levels, said control means recognizing the security level of the card owner from the designation, the designation forming the triggering means if the security level of the ID card owner is one of a subset of the possible security levels which excludes at least one of the possible security levels.

14. A system according to claim 13, wherein the image contained by the ID card is a photograph and said reading means includes means for scanning the photograph to obtain electronic signals forming the read image.

15. A system according to claim 10, wherein the card data includes registered height data and said system further comprises means, connected to the control means, for measuring the passer's height; said control means further comprising means for comparing the measured height and the registered height data and means for controlling the displaying means to display both the measured height and the registered height.

16. A system as in claim 10, wherein said control means comprises means for controlling the display means to simultaneously display the read image, the video signal as the image of the passer, and the retrieved image.

* * * * *